Feb. 21, 1933.  C. K. STROBEL  1,898,321
ELECTRICAL RECTIFIER
Filed Sept. 10, 1931

INVENTOR:
C. K. Strobel,
By   A. R. Vencill
His ATTORNEY.

Patented Feb. 21, 1933

1,898,321

UNITED STATES PATENT OFFICE

CHARLES K. STROBEL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL RECTIFIER

Application filed September 10, 1931. Serial No. 562,043.

My invention relates to electrical rectifiers, and particularly to rectifiers employing asymmetric units of the metal oxide type.

When a rectifier of the type described is to be used for rectifying small currents, it is necessary, if the rectifier is to be efficient, that the units have a high resistance as well as a good rectifying ratio. One way in which the units can be constructed to provide these desirable features is to make them small in physical size. For example, when the rectifier is to carry several mills of current, a unit one-twelfth of an inch in diameter has been found to be very satisfactory. When the units are made small in size, however, considerable difficulty has been experienced in constructing the rectifier in a manner which will insure good electrical contact with the units, it being necessary in order to obtain good electrical contact, to subject the units to a comparatively high pressure which is distributed substantially uniformly over the units. One object of my present invention is to provide a rectifier assembly which will insure good electrical contact with the small asymmetric units, and which at the same time is easy and economical to manufacture.

I will describe three forms of rectifiers embodying my invention, and will then point out the novel features thereof in claims.

Figure 1:
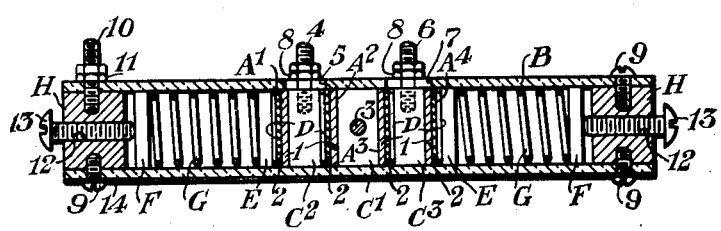
Figure 2:
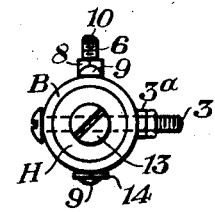
Figure 3:
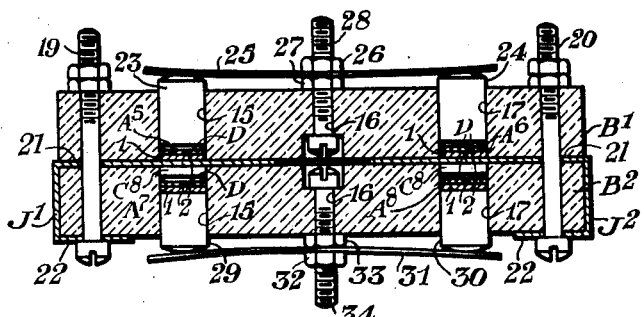
Figure 4:
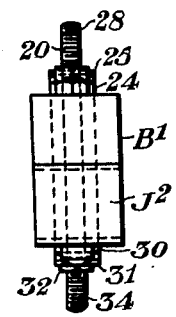
Figure 5:
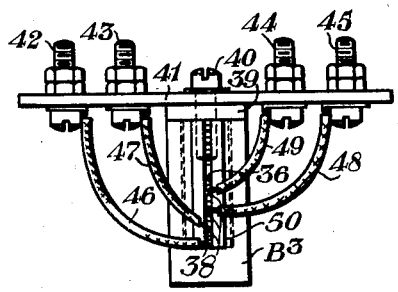
Figure 6:
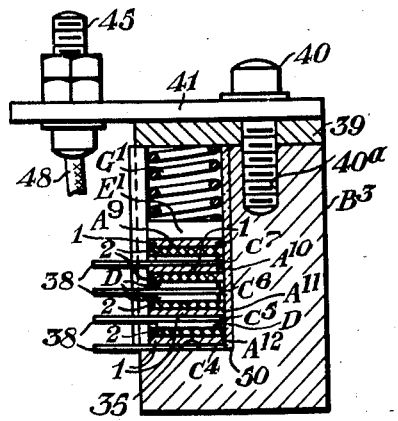

In the accompanying drawing, Fig. 1 is a vertical longitudinal sectional view, showing on an enlarged scale, one form of rectifier embodying my invention, certain of the parts being shown in elevation to more clearly illustrate the construction. Fig. 2 is a left-hand end view of the rectifier shown in Fig. 1. Fig. 3 is a vertical longitudinal sectional view, with some of the parts in elevation, showing on an enlarged scale, another form of rectifier embodying my invention. Fig. 4 is a left-hand end view of the rectifier shown in Fig. 3. Fig. 5 is a view showing in front elevation another form of rectifier embodying my invention. Fig. 6 is an enlarged vertical longitudinal sectional view of the rectifier shown in Fig. 5, with some of the parts in elevation to better illustrate the construction of the rectifier.

Similar reference characters refer to similar parts in each of the several views.

Referring first to Figs. 1 and 2, the rectifier here shown is of the full-wave type, and comprises a plurality of asymmetric units each designated by the reference character A with a suitable distinguishing exponent, and each comprising a flat disk 1 of metal, such as copper, having a coating 2 of a compound of a metal, such as cuprous oxide, formed on one side thereof. Asymmetric units of the type described exhibit the characteristic of offering a higher resistance to current tending to flow from the copper to the oxide than to current tending to flow in the opposite direction through the unit. The asymmetric units A are assembled in a suitable inclosing member, here shown as an insulating tube B, the inside diameter of which is just large enough to receive the units with slight clearance. The two center units $A^2$ and $A^3$ are disposed with their uncoated sides facing each other, and are spaced apart by a conducting spacer $C^1$. The conducting spacer $C^1$ is preferably located near the center of the tube B, and is rigidly fastened thereto by means of a threaded rod or bolt 3 which also serves as a terminal post. The bolt 3 extends through a suitable hole in the spacer $C^1$, and through diametrically opposite clearance holes in the wall of the tube B, and is locked in place by means of a nut $3^a$. The outside units $A^1$ and $A^4$ are disposed with their uncoated sides facing the two inside units $A^2$ and $A^3$, respectively, and are spaced from the inside units by means of conducting spacers $C^2$ and $C^3$ which are similar to the spacer $C^1$. A stud 4 extends through a longitudinally extending slot 5 in the side of the tube B, and is screwed into the spacer $C^2$, and a similar stud 6 extends through a longitudinally extending elongated slot 7 in the tube B, and is screwed into the spacer $C^3$. The studs 4 and 6 serve as terminal posts as will be described hereinafter. In order to prevent movement of the associated spacers when making electrical connections to the rectifier, each of the studs 4 and 6 is provided with a nut 8 which, when tightened, clamps the spacers firmly to the tube. Adjacent the coating 2 of each unit is placed a thin plate D of an impressionable electrical conducting material, such for example as tinned lead. The plates D are preferably somewhat smaller in diameter than the units and are assembled in such manner that they are centered with respect to the coating of the adjacent unit. One way of doing this is to secure the lead plate, by means of a very small spot of a suitable adhesive, such for example as glue, to the center of the face of the adjacent assembly part, which faces the oxide coating. A pressure disk E of suitable electrical conducting material, such as brass, is placed adjacent the two outer plates D, and interposed between each pressure disk E and a similar pressure disk F is a coil spring G. The ends of the tube B are closed by means of metal plugs H which may be fastened to the tube in any suitable manner. As here shown, the right-hand plug H is fastened to the tube by means of two screws 9 which extend through clearance holes in the wall of the tube and are screwed into threaded holes in the plug. The left-hand plug is similarly fastened to the tube by means of a screw 9 and a stud 10 which carries a clamping nut 11. The stud 10 in addition to fastening the left-hand plug H to the tube B, also serves as a terminal post. Each of the plugs H is provided with a threaded axial bore 12 which receives a screw 13, the inner end of which cooperates with the associated pressure disk F. It will be seen that by turning the screws 13 in the proper directions, the springs G may be compressed, thus causing the units, conducting plates, pressure disks, and conducting spacers to be firmly pressed together, and hence insuring good electrical contact between all of these members. The plugs H are electrically connected together by means of a conducting strip 14 having suitable holes adjacent its ends through which the screws 9 pass.

In utilizing the rectifier just described, the terminals of a suitable source of alternating current may be connected to the studs 4 and 6, and the load may be connected to the bolt 3 and stud 10. With this arrangement, the bolt 3 will be positive and the stud 10 will be negative.

Referring now to Figs. 3 and 4, as here shown, the rectifier comprises two inclosing members, here shown as two similar substantially rectangular insulating blocks $B^1$ and $B^2$. The blocks $B^1$ and $B^2$ are secured together in superposed relation by means of bolts 19 and 20, and are each provided, in addition to the holes which receive the bolts 19 and 20, with three spaced vertically extending holes 15, 16 and 17, so arranged that the corresponding holes in the two blocks are in axial alignment. A strip $J^1$ of suitable conducting material, such as phosphor bronze, is bent around the left-hand end of the block $B^2$ into a substantially U-shape, and has one leg 21 thereof clamped between the blocks $B^1$ and $B^2$, and the other leg 22 thereof engaging the underside of the block $B^2$. The leg 21 of the strip $J^1$ is of such length that it extends inwardly toward the center of the blocks $B^1$ and $B^2$ to a position past the aligned holes 15, and the leg 22, which is shorter than the leg 21, is of such length that this leg is spaced from the hole 15 in the block $B^2$, as will clearly be apparent from an inspection of the drawing. Both legs 21 and 22 are provided with holes which receive the bolt 19 with slight clearance. It will be seen, therefore, that the bolt 19 which also serves as a terminal post, is electrically connected with the strip $J^1$. A strip $J^2$, similar to the strip $J^1$, is bent around the right-hand end of the block $B^2$ into a substantially U-shape in the same manner as the strip $J^1$ is bent around the left-hand end of this block, and the legs 21 and 22 thereof are provided with suitable holes which receive the bolt 20 with slight clearance. It follows, therefore, that the bolt 20 which serves as another terminal post, is electrically connected with the strip $J^2$. Located in the holes 15 and 17 in the block $B^1$ are asymmetric units $A^5$ and $A^6$, respectively, and located in the holes 15 and 17 in the block $B^2$ are asymmetric units $A^7$ and $A^8$, respectively. The asymmetric units $A^5$ and $A^6$ are disposed with their uncoated sides down and in engagement with the legs 21 of the strips $J^1$ and $J^2$. Extending into the holes 15 and 17 of the block $B^1$ above the units $A^5$ and $A^6$, are two pressure rods 23 and 24, and interposed between these pressure rods and the units $A^5$ and $A^6$ are impressionable conducting plates D. The impressionable conducting plates D are somewhat smaller in diameter than the coating of the asymmetric units, and are assembled in a centered position with respect to the coating of the units. Pressure is applied to the pressure rods 23 and 24 by means of a leaf spring 25. The leaf spring 25 is of suitable electrical conducting material, such for example as phosphor bronze, and is clamped intermediate its ends between two nuts 26 and 27 carried by a bolt 28 which extends upwardly through a hole 16 in the block $B^1$. The units $A^7$ and $A^8$ are disposed with their coating 2 up, and interposed between each of these units and the leg 21 of the adjacent strip J is an impressionable conducting plate D and a conducting spacer $C^8$. Pressure rods 29 and 30 similar to the pressure rods 23 and 24, extend into the holes 15 and 17 in the block $B^2$ below the units $A^7$ and $A^8$ in such manner that their upper ends engage the uncoated sides of the associated asymmetric unit, and pressure is applied to these rods by means of a leaf spring 31. The leaf spring 31 is clamped intermediate its ends between two nuts 32 and 33 carried by a bolt 34 which extends downwardly through the hole 16 in the block $B^2$.

With the rectifier constructed as shown in Figs. 3 and 4, it will be seen that the coated side of the unit $A^7$ and the uncoated side of the unit $A^5$ are electrically connected to the bolt 19, and that the coated side of the unit $A^8$ and the metallic side of the unit $A^6$ are electrically connected to the bolt 20. It will also be seen that the coated side of both units $A^5$ and $A^6$ is electrically connected to the bolt 28, and that the uncoated side of both units $A^7$ and $A^8$ is electrically connected to the bolt 34. In utilizing the rectifier shown in Figs. 3 and 4 a suitable source of alternating current may be connected to the bolts 19 and 20, and the load may be connected to the bolts 28 and 34, the bolts 28 being positive, and the bolt 34 being negative.

Referring now to Figs. 5 and 6, as here shown, the rectifier comprises four asymmetric units $A^9$, $A^{10}$, $A^{11}$ and $A^{12}$ which are assembled in a suitable hole 35 formed in an inclosing member $B^3$. In the embodiment illustrated, the inclosing member is in the form of a rectangular block, and is preferably constructed of brass. It will be readily understood, however, that the inclosing member may have any desired shape and may be constructed of any other suitable metal. The hole 35 extends downwardly from the top of the block to a suitable depth, and has a diameter somewhat larger than the asymmetric units A. The portion of the block adjacent the left-hand side of the hole 35 as viewed in Fig. 6 is provided with a slot 36 (see Fig. 5) which is the same length as the hole 35, and which extends into the hole 35 throughout its length. The sides of the hole 35 and slot 36 are covered by a piece 50 of suitable insulating material, such as paper, which may be glued or otherwise fastened in place. As will be apparent from an inspection of the drawing, in the particular embodiment illustrated, the units $A^{11}$ and $A^{12}$ are assembled in the hole 35 with their coating 2 up, while the units $A^9$ and $A^{10}$ are disposed with their coating 2 down. Interposed between each two adjacent units A, and between the bottom unit $A^{12}$ and the bottom of the hole 35, is a conducting spacer, designated by the reference character C with a suitable distinguishing exponent, and adjacent the coating 2 of each unit is placed an impressionable conducting plate D. Each conducting spacer C is provided with an integral lug 38 which extends outwardly through the slot 36 to facilitate the making of electrical connections with the units. A pressure disk $E^1$ is placed adjacent the metal 1 of the upper unit $A^9$, and interposed between this pressure disk and a metal cover 39 which closes the upper end of the hole 35 is a compressed coil spring $G^1$. The cover 39 is fastened to the block $B^3$ by means of a screw 40 which passes through a suitable clearance hole in the cover, and is threaded into a tapped hole $40^a$ in the block $B^3$. Also fastened to the block $B^3$ by means of the screw 40 is an insulated terminal board 41 carrying four terminal posts 42, 43, 44 and 45. As will be apparent from an inspection of Fig. 5, the terminal posts 42, 43, 44 and 45 are fastened by means of conductors 46, 47, 48 and 49 with the lugs 38 on the conducting spacers $C^4$, $C^5$, $C^6$ and $C^7$, respectively. It will be understood that since the block $B^3$ is metal, the metal side of the unit $A^9$ is electrically connected with the conducting disk $C^4$ through the medium of the pressure disk $E^1$, the spring $G^1$, cover 39 and block $B^3$.

In utilizing the rectifier shown in Figs. 5 and 6, a suitable source of alternating current may be connected with the terminal posts 43 and 44, and the load may be connected with the terminal posts 42 and 45, the terminal post 42 being positive and the terminal post 45 being negative.

It should be pointed out that, while in describing my invention, I have shown only full-wave rectifiers in which each leg of the rectifier consists of a single asymmetric unit, in actual practice the rectifier may be constructed with as many units in series in each leg as are necessary to enable the rectifier to be operated on the desired electromotive force.

Although I have herein shown and described only three forms of electrical rectifier embodying my invention, it is understood that various changes and modifications may be made therein within the scope of the appended claims without departing from the spirit and scope of my invention.

Having thus described my invention, what I claim is:

1. A rectifier comprising an inclosing member provided with a hole, a conducting plug secured to said member in said hole and provided with a threaded axial bore, a first conducting member in said hole spaced from said plug and secured to said inclosing member, an asymmetric unit in said hole interposed between said plug and said first conducting member, a second and a third conducting member in said hole between said plug and said asymmetric unit, a coiled spring in said hole between said second and third conducting members, and a screw screwed through the bore in said plug and cooperating with said second conducting member in such manner that when said screw is screwed inwardly said second conducting member compresses said spring to subject said asymmetric unit to a comparatively high pressure.

2. A rectifier comprising an inclosing member provided with a hole, a conducting plug secured to said member in said hole and provided with a threaded axial bore, a first conducting member in said hole spaced from said plug and secured to said inclosing member, an asymmetric unit interposed between said plug and said first conducting member, a second and a third conducting member in said hole between said plug and said asymmetric unit, an impressionable conducting plate interposed between one side of said unit and the adjacent conducting member, a coiled spring in said hole between said second and third conducting members, and a screw screwed through the bore in said plug and coooperating with said second conducting member in such manner that when said screw is screwed inwardly said second conducting member compresses said spring to exert a relatively high pressure on said asymmetric unit.

3. A rectifier comprising an insulating tube, a plurality of asymmetric units in said tube each comprising a metal disk having a coating of a compound of the metal on one side thereof, a plurality of conducting spacers in said tube one between each two adjacent units, a plurality of impressionable conducting plates in said tube one adjacent the coating of each unit, two metal plugs one fastened to said tube in each end of the tube and each provided with a threaded bore, a pair of pressure plates between each plug and the adjacent unit, two springs one between each pair of pressure plates, and two screws one screwed through the bore in each plug and each cooperating with the adjacent pressure plate to compress the adjacent spring.

4. A rectifier comprising an insulating tube, a first metal plug fastened to said tube in one end of the tube and a second metal plug fastened to said tube in the other end of the tube, each said plug being provided with a threaded axial bore, a first pressure disk in said tube adjacent said first plug and a second pressure disk in said tube adjacent said second plug, a third and a fourth pressure disk in said tube between said first and second disks, two springs in said tube one interposed between said first and third pressure disks and one interposed between said second and fourth pressure disks, a plurality of asymmetric units in said tube between said third and fourth pressure disks, a plurality of conducting spacers in said tube one between each two adjacent units, a plurality of impressionable conducting plates in said tube one adjacent one side of each unit, and two screws one screwed through the threaded bore in each plug and cooperating at its inner end with the adjacent pressure disks to compress said springs for exerting a pressure on said units.

5. A rectifier comprising an insulating tube, a first metal plug fastened to said tube in one end of the tube and a second metal plug fastened to said tube in the other end of the tube, each said plug being provided with a threaded axial bore, a first pressure disk in said tube adjacent said first plug and a second pressure disk in said tube adjacent said second plug, a third and a fourth pressure disk in said tube between said first and second disks, two springs in said tube one interposed between said first and third pressure disks and one interposed between said second and fourth pressure disks, a plurality of asymmetric units in said tube between said third and fourth pressure disks, a plurality of conducting spacers in said tube one between each two adjacent units, a plurality of impressionable conducting plates in said tube one adjacent one side of each unit, and two screws one screwed through the threaded bore in each plug and cooperating at its inner end with the adjacent pressure disks to compress said springs for exerting a pressure on said units, and means extending through the wall of said tube for making external electrical connections with each said spacer and with both said plugs.

In testimony whereof I affix my signature.

CHARLES K. STROBEL.